United States Patent Office 3,590,073
Patented June 29, 1971

---

3,590,073
ESTERIFICATION OF TERTIARY ALCOHOLS
Lawrence J. Carr, Glenolden, Rudolph Rosenthal, Broomall, and Giovanni A. Bonetti, Wynnewood, Pa., assignors to Atlantic Richfield Company, Philadelphia, Pa.
No Drawing. Filed Dec. 15, 1967, Ser. No. 690,777
Int. Cl. C07c *67/00*
U.S. Cl. 260—476R
10 Claims

ABSTRACT OF THE DISCLOSURE

Method for the esterification of aliphatic acyclic tertiary alcohols having from 4 to 8 carbon atoms by reacting the alcohol with an organic carboxylic acid in the presence of a cation exchange resin.

---

BACKGROUND OF THE INVENTION

Field of the invention

This invention relates to the esterification of tertiary alcohols with an organic carboxylic acid in the presence of a cation exchange resin and more particularly to the esterification of aliphatic acyclic tertiary alcohols having from 4 to 8 carbon atoms with an organic carboxylic acid having from 2 to 20 carbon atoms in the presence of a sulfonic acid cation exchange resin.

Prior art

It is well known that primary and secondary alcohols form esters when heated with a carboxylic acid in the presence of a strong acid catalyst, whereas under the same conditions tertiary alcohols undergo extensive dehydration to olefins. Accordingly heretofore in order to prepare esters corresponding to tertiary alcohols it has been necessary to react the olefin with a carboxylic acid or other indirect methods as described in Fieser and Fieser "Advanced Organic Chemistry," 1961 edition, page 374, Reinhold, N.Y.

The reaction of olefins with aliphatic carboxylic acids using cation exchange resins as the catalyst has also been shown in the prior art but since the activity of these resins is lower than many of the commonly used homogeneous catalysts such as sulfuric acid, their use frequently required prolonged reaction times at elevated temperatures. When preparing tertiary alkyl esters by reacting the olefin with the acid the use of these high temperatures was disadvantageous since the reaction tends to reverse at elevated temperatures.

The disadvantages of the prior art process of reacting olefins with carboxylic acids was overcome by the use of novel cation exchange resins as shown in U.S. Pat. No. 3,037,052 (1962). The cation exchange resins disclosed in this patent are of the sulfonic acid type and have a macro-reticular structure. Their preparation and properties are described in detail in this patent. According to the patent esters can be prepared by reacting the olefin and carboxylic acid in a non-aqueous system at low temperatures using the resins of the patent as the catalyst.

Contrary to the prior art it now has been found that tertiary alcohols can be esterified directly with carboxylic acids in non-aqueous systems using the cation exchange resins having the macro-reticular structure of Pat. 3,037,052.

SUMMARY OF THE INVENTION

As stated, this invention is concerned with the direct esterification of a $C_4$ to $C_8$ aliphatic acyclic tertiary alcohol with an organic carboxylic acid having from 2 to 20 carbon atoms in the molecule utilizing a non-aqueous system and a catalyst consisting of a sulfonic acid cation exchange resin which has a macro-reticular structure.

It is an object of this invention, therefore, to provide a method for the direct esterification of an aliphatic acyclic tertiary alcohol.

It is another object of this invention to provide a method for the direct esterification of an aliphatic acyclic tertiary alcohol using a cation exchange resin as the catalyst.

Other objects of this invention will be apparent from the following description of the preferred embodiments and claims.

DESCRIPTION OF THE PREFERRED EMBODIMENTS

The alcohols which are esterified in accordance with this invention are aliphatic acyclic tertiary alcohols having from 4 to 8 carbon atoms. They are characterized by the formula:

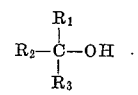

where $R_1$, $R_2$ and $R_3$ are alkyl radicals having a total of from 3 to 7 carbon atoms. When all three of the R groups are methyl the alcohol is tertiary butyl alcohol and when two of the R radicals are methyl and the third is ethyl, the alcohol is tertiary amyl alcohol (2-methyl-2-butanol). Similarly, $R_1$ and $R_2$ can be methyl with $R_3$ being ethyl, propyl, isopropyl, butyl, isobutyl, amyl or isoamyl. Other combinations which are suitable are $R_1$ and $R_2$ being ethyl radicals with $R_3$ being methyl, ethyl or propyl; $R_1$ and $R_2$ being propyl radicals with $R_3$ being methyl; and $R_1$ being a methyl radical, $R_2$ being an ethyl radical and $R_3$ being propyl or butyl. Particularly preferred are tertiary butyl alcohol and tertiary amyl alcohol.

The organic carboxylic acids which can be used to form esters with the tertiary alcohols of this invention have from 2 to 20 carbon atoms and can be mono-, di- or polycarboxylic, they can be aliphatic or aromatic, saturated or unsaturated, unsubstituted or having one or more hydrogens substituted by halogen, nitro, or other like groups. For example, fatty acids can be employed such as acetic acid, propionic acid, butyric acid, caproic acid, caprylic acid, capric aid, stearic acid, oleic acid, linolenic acid and arachidic acid. Acetic acid, propionic acid, butyric acid and valeric acid are particularly preferred. Unsaturated acids may be used, for example, acrylic acid, methacrylic acid and the like.

Dicarboxylic acids also can be employed, for example, oxalic acid, succinic acid, maleic acid, tartaric acid and the like. Similar polycarboxylic acids also can be used.

A preferred aromatic carboxylic acid is benzoic acid, however, other aromatic acids can be used such as toluic acid, diphenyl acetic acid and the like.

The catalysts used are the sulfonic acid type cation exchange resins having a macro-reticular structure. As the name implies, these are used in their acid or hydrogen form. These catalysts, their properties and method of preparation are shown in U.S. Pat. No. 3,037,052. These are available commercially and are sold under the trade name Amberlyst-15. These macro-reticular structure catalysts have been found to be superior to conventional prior art sulfonic acid type cation exchange resins.

The esterification reaction can be carried out at temperatures ranging from about $-20°$ C. to $50°$ C. with the preferred range being from room temperature to about $40°$ C. The higher temperatures are only necessary when the higher alcohols and acids are used. In general high temperatures should be avoided and this can be accomplished by the use of non-aqueous and non-reactive solvents well-known in the art, for example, diethyl ether.

The reaction is carried out in a non-aqueous system, the reactants and catalyst being substantially anhydrous. The reaction can be carried out either in batch or continuous manner. In the continuous method the reactants are passed over a bed of the cation exchange resin, for example, in a tubular reactor which can be temperature controlled. In the batch process the reactants and product are separated from the resin by filtration or centrifugation and the reactants and product are separated by conventional methods.

It is preferred to employ an excess of the acid over the alcohol for example a mole ratio of from 1.5:1 to 40:1. The higher mole ratios result in higher conversions of the alcohol and higher yield of ester based on alcohol charged.

The following examples are provided for the purpose of illustrating the invention in greater detail, but these are not to be construed as limiting.

EXAMPLE I

To a 1.4 cm. by 45 cm. column containing glacial acetic acid at room temperature was added 20 g. of dry Amberlyst-15 cation exchange resin. Acetic acid was passed through the resin until the eluant was colorless. A solution containing 55 g. (0.74 mole) of t-butyl alcohol in 445 g. (7.40 mole) of acetic acid was passed through the column at a rate of 0.5 ml./min. at ambient temperature. The final portion of the t-butyl alcohol-acetic acid mixture was rinsed from the column with 100 ml. of acetic acid. To the collected material was added 800 ml. of water and 250 ml. of pentane. The layers were separated, and the aqueous layer extracted with two additional 100 ml. portions of pentane. The combined pentane fractions were washed with 100 ml. of 10 percent sodium carbonate solution and dried over anhydrous sodium sulfate. Fractional distillation at atmospheric pressure gave 17.6 g. (25 percent yield based on the t-butyl alcohol charged) of pure t-butyl acetate (B.P. 97–98° C.).

When the above pentane-water extraction procedure was omitted, a ternary azeotrope (B.P. 78° C.) of t-butyl acetate, t-butyl alcohol and water was obtained on distillation.

EXAMPLE II

A mixture containing 7.4 g. (0.10 mole) of t-butyl alcohol, 86.0 g. (1.00 mole) methacrylic acid and 5.0 g. of Amberlyst-15 was stirred at 26° C. for twenty-four hours. Quantitative gas-liquid chromatographic analysis of the resulting solution indicated a 22 percent yield of t-butyl methacrylate based on the t-butyl alcohol charged to the reactor.

EXAMPLE III

A mixture containing 61.0 g. (0.50 mole) of benzoic acid, 7.4 g. (0.10 mole) of t-butyl alcohol, 250 ml. of anhydrous diethyl ether and 10.0 g. of Amberlyst-15 was stirred at 23° C. for 17 hours. Quantitative gas-liquid chromatographic analysis of the final mixture indicated an 11 percent yield of t-butyl benzoate based on the t-butyl alcohol charged to the reactor.

These results show that both batch and continuous methods may be employed to esterify tertiary alcohols with various types of acids. In general, with batch techniques a time of from 2 hours to 24 hours may be used although longer and shorter times may be employed depending upon the particular reactants. Times of from 3 to 6 hours are generally preferred. With continuous techniques liquid hourly space velocities of from 0.1 to 5 grams of reactants/gram of catalyst/hour can be used. The space velocity is not critical since the reactants can be recycled by conventional techniques after removal of the water and ester products.

EXAMPLE IV

Four runs were carried out using batch reactions as in Examples II and III using a 10:1 mole ratio of acetic acid to tertiary butyl alcohol in an anhydrous system. The reaction temperature was 27° C. The results obtained are shown in Table I.

TABLE I

| Catalyst | Percent t-BuOH [1] converted | Mole, percent yield [2] t-BuOAc [3] | Mole, percent yield [4] t-BuOAc |
|---|---|---|---|
| None | 2 | 0 | 0 |
| HCl | ([5]) | <1 | ([5]) |
| Amberlyst-15 | 43 | 37 | 88 |
| Dowex 50W-X1 | 51 | 27 | 54 |

[1] t-BuOH is tertiary butyl alcohol.
[2] Yield tertiary butyl acetate based on tertiary butyl alcohol charged.
[3] t-BuOAc is tertiary butyl acetate.
[4] Yield tertiary butyl acetate based on tertiary butyl alcohol converted.
[5] Not determined.

These results show the criticality of employing the sulfonic acid type cation exchange resin having a macroreticular structure as the catalyst in the method of this invention.

EXAMPLE V

A continuous run was carried out as described in Example I to determine the life of the Amberlyst-15 catalyst. It was found that the percent conversion of tertiary butyl alcohol (42–44 percent) and the yield of tertiary butyl acetate (36–37 mole percent based on charge alcohol) remained constant throughout the passing of 3.6 kilograms of a 10 percent solution of tertiary butyl alcohol in glacial acetic acid over 20.0 g. of Amberlyst-15 at a flow rate of 1–2 g./g./hour.

EXAMPLE VI

Continuous runs were carried out at various temperatures using the method of Example I, a 10:1 mole ratio of glacial acetic acid to dry tertiary butyl alcohol, 20.0 g. of Amberlyst-15 catalyst and a flow rate of 1–2 g./g./hour. The results are shown in Table II.

TABLE II

| Temp., °C. | Percent t-BuOH [1] converted | Mole, percent yield [2] t-BuOAc [3] | Mole, percent yield [4] t-BuOAc |
|---|---|---|---|
| 16 | 31.8 | 31.1 | 97.8 |
| 31 | 41.6 | 39.8 | 95.8 |
| 35 | 41.0 | 39.4 | 96.3 |
| 40 | 41.2 | 37.4 | 91.0 |
| 49 | 46.9 | 38.5 | 83.5 |

[1] Tertiary butyl alcohol.
[2] Yield of tertiary butyl acetate based on t-BuOH charged.
[3] Tertiary butyl acetate.
[4] Yield t-BuOAc based on t-BuOH converted.

These results show that the lower temperatures are preferable since at temperatures above about 40° C. the tertiary butyl alcohol begins to undergo appreciable dehydration to isobutylene and the tertiary butyl acetate begins to undergo decomposition to isobutylene and acetic acid.

EXAMPLE VII

In order to demonstrate the necessity of employing essentially anhydrous starting materials two comparable runs were carried out at 27° C. with acetic acid to tertiary butyl alcohol mole ratio 10:1 and Amberlyst-15 catalyst. In the first run glacial acetic acid was used and a yield of tertiary butyl acetate of 37 mole percent based on the alcohol charged was obtained. In the second run 80 percent acetic acid was used (the concentration of water in the reaction mixture was 18 weight percent). The yield of tertiary butyl acetate dropped to zero in the second run.

In two similar runs dry tertiary butyl alcohol was compared with undried tertiary butyl alcohol having a water content of about 1.5 weight percent. The dried alcohol gave a yield of tertiary butyl acetate about 5 percent higher than the undried alcohol.

EXAMPLE VIII

In order to show the effect of mole ratio on conversion batch runs were carried out using Amberlyst-15 resin, a temperature of about 27° C. for about 5 hours with acetic acid and tertiary butyl alcohol as the reactants. The results are shown in Table III.

TABLE III

| Mole ratio, acid:alcohol | Percent t-BuOH[1] converted | Mole, percent yield[2] t-BuOAc[3] | Mole, percent yield[4] t-BuOAc |
|---|---|---|---|
| 25 | 50.7 | 45.2 | 89.4 |
| 10 | 43 | 37 | 88 |
| 3 | 27 | 24 | 90 |
| 0.1 | | <1 | |

[1] Tertiary butyl alcohol.
[2] Yield of tertiary butyl acetate based on t-BuOH charged.
[3] Tertiary butyl acetate.
[4] Yield t-BuOAc based on t-BuOH converted.

These results show that as the mole ratio of acid to alcohol is increased the percent alcohol converted and the mole percent yield of ester based on alcohol charged both increase. The mole percent yield of ester based on the alcohol converted remains substantially constant, however.

As many possible embodiments can be made of this invention without departing from the broad scope thereof, it is to be understood that all matter herein set forth is to be interpreted as illustrative and not as unduly limiting the invention.

We claim:

1. A method for the direct esterification of an aliphatic acyclic tertiary alcohol having from 4 to 8 carbon atoms in the molecule which comprises contacting said alcohol with a hydrocarbon carboxylic acid having from 2 to 20 carbon atoms in the molecule in a non-aqueous system in the presence of a catalyst consisting of a sulfonic acid cation exchange resin used in its acid form and having a macro-reticular structure.

2. The method according to claim 1 wherein the esterification reaction is carried out at a temperature of about −20° C. to 50° C.

3. The method according to claim 1 wherein the mole ratio of the hydrocarbon carboxylic acid to the aliphatic acyclic tertiary alcohol is in the range of from 1.5:1 to 40:1.

4. The method according to claim 1 wherein the esterification reaction is carried out in a continuous system with a liquid hourly space velocity in the range of from 0.1 to 5 grams of reactant/gram of catalyst/hour.

5. The method according to claim 1 wherein the alcohol is tertiary butyl alcohol.

6. The method according to claim 5 wherein the carboxylic acid is acetic acid.

7. The method according to claim 5 wherein the carboxylic acid is methacrylic acid.

8. The method according to claim 5 wherein the carboxylic acid is benzoic acid.

9. The method according to claim 1 wherein the aliphatic acyclic tertiary alcohol is tertiary butyl alcohol, the hydrocarbon carboxylic acid is acetic acid, the reaction is carried out under batch conditions for from 3 to 5 hours at a temperature in the range of from 25° C. to 40° C. with a mole ratio of acid to alcohol in the range of from 10:1 to 25:1.

10. The method according to claim 1 wherein the aliphatic acyclic tertiary alcohol is tertiary butyl alcohol, the hydrocarbon carboxylic acid is acetic acid, the reaction is carried out in a continuous system at a temperature in the range of from 25° C. to 40° C. with a mole ratio of acid to alcohol in the range of from 10:1 to 25:1 with a liquid hourly space velocity in the range of from 0.1 to 5 grams of reactants/gram of catalyst/hour.

References Cited

UNITED STATES PATENTS

| 3,278,585 | 10/1966 | Baker | 260—473 |
| 3,037,052 | 5/1962 | Bortnick | 260—485 |

LEWIS GOTTS, Primary Examiner

E. J. GLEIMAN, Assistant Examiner

U.S. Cl. X.R.

260—410.9, 468R, 468.5, 469, 470, 471R, 473R, 474, 475R, 478, 481R, 482R, 483, 484R, 485R, 486R, 487, 488F